Nov. 11, 1952     R. W. ANDERSON     2,617,280
SERVING DISH
Filed Dec. 28, 1949
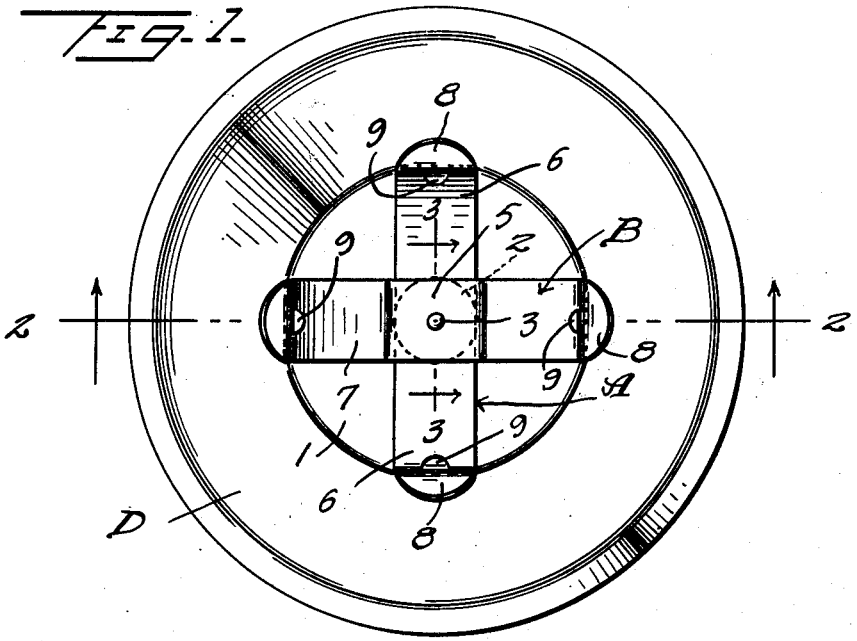
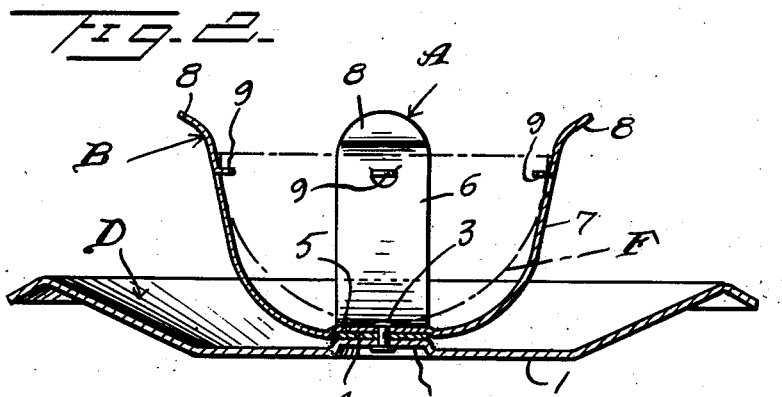
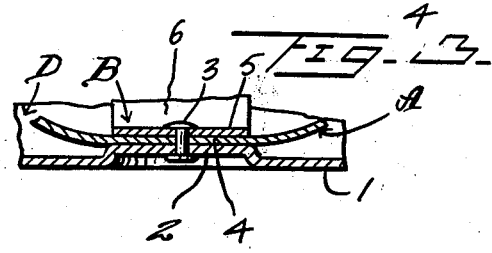
INVENTOR
Roy W. Anderson
BY
ATTORNEY Patented Nov. 11, 1952

2,617,280

UNITED STATES PATENT OFFICE 2,617,280

SERVING DISH

Roy W. Anderson, Burt, Iowa

Application December 28, 1949, Serial No. 135,378

1 Claim. (Cl. 65—15)

This invention relates to a serving dish and it is primarily an object of the invention to provide a dish for use in the service in halves of grapefruit, oranges, cantaloupes and the like.

Furthermore, it is an object of the invention to provide a dish of the kind having means to engage the fruit or the like placed thereon in a manner to hold the fruit or the like upon the dish in a manner to allow eating of the fruit without holding the same in a hand.

The invention consists in the details of construction and in the combination and arrangement of the several parts of my improved serving dish, whereby certain advantages are attained, as will be hereinafter more fully set forth.

In order that my invention may be better understood, I will now proceed to describe the same with reference to the accompanying drawings wherein:

Figure 1 is a view in top plan of a serving dish constructed in accordance with an embodiment of the invention;

Figure 2 is a sectional view taken substantially on the line 2—2 of Figure 1, an applied half of a fruit being indicated by broken lines;

Figure 3 is a detail sectional view taken substantially on the line 3—3 of Figure 1.

In the embodiment of the invention as illustrated in the accompanying drawings, D denotes a shallow dish body of desired dimensions and design but preferably circular in top plan. The central flat portion 1 has upwardly pressed therefrom, or otherwise formed, an upstanding flat platform 2, circular in top plan as indicated by the broken line in Figure 1.

Pivotally held, as at 3, to the axial center of the platform 2 is a holding or retaining unit. As herein comprised this unit comprises two substantially U-shaped members A and B, in substantially right angular relation. The intermedial or base portion 4 of the member A rests directly from above on the platform 3 while the intermediate or base portion 5 of the member B is upwardly offset to straddle the intermediate or base portion 2 of the member A whereby said members are held against independent turning movement one with respect to the other.

The arms 6 of the member A and also the arms 7 of the member B possess inherent resiliency and each of said arms 6 and 7 has its outer end portion outwardly flared, as at 8. Each of said arms 6 and 7 inwardly of but in close proximity of the outer flared portion thereof, has struck inwardly thereof a lug or prong 9, adapted to penetrate the half fruit F, engaged between the arms 6 and 7 and at points adjacent to the outwardly or upwardly flat face of the fruit, as indicated in Figure 2.

In practice the half fruit F with its flat face uppermost, is forced down between the arms 6 and 7 which will readily yield or expand in accordance with the size of the half fruit. The lugs or prongs 9 are then pressed into the fruit, thus holding the fruit F securely on the dish in a manner to allow eating of the fruit without holding the same in the hand.

As shown in the accompanying drawings each of the arms 6 and 7 is substantially flat in cross section and of a width at all points therealong substantially equal to the diameter to the upwardly offset portion or raised platform 2 of the dish body D.

From the foregoing description it is thought to be obvious that a serving dish constructed in accordance with my invention is particularly well adapted for use by reason of the convenience and facility with which it may be assembled and operated.

I claim:

A fruit server of the character stated, comprising a dish having a flat bottom, the center of said dish bottom having an up-pressed platform, a pair of U-shaped members each formed of a flat strip of resilient material of constant width throughout and disposed uprightly in crossed relation upon said platform one within the other in vertical planes perpendicular to one another, said members providing four upright resilient arms and said material and platform being of the same width, a single securing pivot member passing through the crossed portions of said members and through the center of the platform, means for holding said U-shaped members against relative rotation comprising an upwardly offset portion of the center of the upper one of the U-shaped members providing a recess in which the lower one of the U-shaped members is engaged whereby the two members are locked together, and a fruit engaging holding prong struck inwardly from each arm.

ROY W. ANDERSON.

REFERENCES CITED

The following references are of record in the file of this patent:

UNITED STATES PATENTS

| Number | Name | Date |
|---|---|---|
| 251,754 | Wires | Jan. 3, 1882 |
| 521,612 | Hiller et al. | June 19, 1894 |
| 521,613 | Hiller | June 19, 1894 |
| 559,527 | Heilborn | May 5, 1896 |
| 948,476 | Daumeyer | Feb. 8, 1910 |
| 1,147,856 | Gilchrist | July 27, 1915 |
| 1,405,662 | Biette | Feb. 7, 1922 |